United States Patent
Shih et al.

(10) Patent No.: US 11,218,828 B1
(45) Date of Patent: Jan. 4, 2022

(54) AUDIO TRANSPARENCY MODE IN AN INFORMATION HANDLING SYSTEM

(71) Applicant: Dell Products L.P., Round Rock, TX (US)

(72) Inventors: Chia Hung Shih, Taipei (TW); Vivek Viswanathan Iyer, Austin, TX (US); Jing Yuan Lin, New Taipei (TW); Yi-Tsen Kao, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/039,265

(22) Filed: Sep. 30, 2020

(51) Int. Cl.
*G06F 3/16* (2006.01)
*H04S 7/00* (2006.01)
*H04R 5/04* (2006.01)

(52) U.S. Cl.
CPC .............. *H04S 7/301* (2013.01); *G06F 3/165* (2013.01); *H04R 5/04* (2013.01); *H04R 2227/005* (2013.01)

(58) Field of Classification Search
CPC ........... H04S 7/301; G06F 3/165; H04R 5/04; H04R 2227/005
See application file for complete search history.

(56) References Cited

U.S. PATENT DOCUMENTS

| | | | | |
|---|---|---|---|---|
| 9,398,367 B1* | 7/2016 | Scott | ..................... | H04R 1/1083 |
| 10,375,465 B2* | 8/2019 | Sahay | .................. | H04R 1/1083 |
| 10,754,611 B2* | 8/2020 | Agrawal | ................. | G06F 3/017 |
| 10,884,696 B1* | 1/2021 | Willis | ..................... | G10L 25/51 |
| 2012/0213393 A1* | 8/2012 | Foo | ....................... | H04R 25/554 381/315 |
| 2015/0181356 A1* | 6/2015 | Krystek | ............... | H04R 25/558 381/315 |
| 2015/0195641 A1* | 7/2015 | Di Censo | ............. | H04R 1/1083 381/71.6 |
| 2015/0222977 A1* | 8/2015 | Angel, Jr. | .............. | H04R 1/105 381/74 |
| 2016/0353195 A1* | 12/2016 | Lott | .................... | H04W 12/065 |
| 2020/0296510 A1* | 9/2020 | Li | ........................... | G06F 3/167 |
| 2020/0320878 A1* | 10/2020 | Ljung Aust | ............ | G08G 1/005 |

* cited by examiner

*Primary Examiner* — Joseph Saunders, Jr.
(74) *Attorney, Agent, or Firm* — Baker Botts L.L.P.

(57) ABSTRACT

Performing an audio transparency mode of an information handling system (IHS), including performing a calibration and configuration of an audio noise source identification model, including: training the audio noise source identification model, including generating a configuration policy including configuration rules for performing computer-implemented actions for providing a particular noise source through an audio output of the IHS, providing a notification of the particular noise source to devices associated with the user, or both; performing a steady-state monitoring of the IHS, including: identifying a particular noise source of environment of the IHS; and in response: identifying configuration rules of the audio noise source identification model based on the identified particular noise source, applying the configuration rules to perform computer-implemented actions to provide the particular noise source through the audio output of the IHS, provide a notification of the particular noise source to the devices associated with the user, or both.

15 Claims, 3 Drawing Sheets

AUDIO TRANSPARENCY MODE IN AN INFORMATION HANDLING SYSTEM

BACKGROUND

Field of the Disclosure

The disclosure relates generally to an information handling system, and in particular, an audio transparency mode in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Immersive productivity focuses on creating an immersive environment that allows a user of an information handling system to stay in his/her workflow. The creation of the immersive environment centers on the elimination of external distractions, providing assistance to the user on key tasks, and augmented capabilities to improve productivity. The elimination of distractions includes blocking interruptions such as notifications and alerts, as well as providing indications such as do-not-disturb to other parties. Assistance to the user includes contextually-driven actions and performance enhancements based on the users' current tasks.

SUMMARY

Innovative aspects of the subject matter described in this specification may be embodied in method for performing an audio transparency mode of an information handling system, comprising: performing, at a first time, a calibration and configuration of an audio noise source identification model, including: identifying a plurality of noise sources associated with an environment of the information handling system; receiving user input from a user associated with the information handling system selecting a subset of the plurality of noise sources; training, based on the subset of the plurality of noise sources, the audio noise source identification model, including generating a configuration policy including configuration rules, the configuration rules for performing computer-implemented actions for providing a particular noise source of the subset of the plurality of noise sources through an audio output of the information handling system, providing a notification of the particular noise source to one or more devices associated with the user, or both; performing, at a second time, a steady-state monitoring of the information handling system, including: identifying a particular noise source of environment of the information handling system; and in response to identifying the particular noise source of the environment of the information handling system: i) accessing the audio noise source identification model including the configuration policy, ii) identifying one or more of the configuration rules of the audio noise source identification model based on the identified particular noise source, and iii) applying the one or more configuration rules to perform one or more of the computer-implemented actions to provide the particular noise source through the audio output of the information handling system, provide a notification of the particular noise source to the one or more devices associated with the user, or both.

Other embodiments of these aspects include corresponding systems, apparatus, and computer programs, configured to perform the actions of the methods, encoded on computer storage devices.

These and other embodiments may each optionally include one or more of the following features. For instance, providing the notification to the one or more devices associated with the user includes providing the notification on a display device of the information handling system. Providing the notification to the one or more devices associated with the user includes providing the notification on a secondary computing device associated with the user. The secondary computing device is a smartphone, or tablet computing device. Providing the particular noise source through the audio output of the information handling system further includes multiplexing the particular noise source with an existing audio stream of the audio output of the information handling system. Providing the particular noise source through the audio output of the information handling system further includes muting an existing audio stream of the audio output of the information handling system. Identifying the plurality of noise sources associated with the environment of the information handling system further comprises receiving a recorded version of each respective noise source of the plurality of noise sources. Identifying the plurality of noise sources associated with the environment of the information handling system further comprises detecting the plurality of noise sources over a time period, and providing a listing of the plurality of noise sources to the user. The audio output is provided through headphones connected to the information handling system. The audio transparency mode is performed at the information handling system, a cloud computing server connected to the information handling system, or both.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
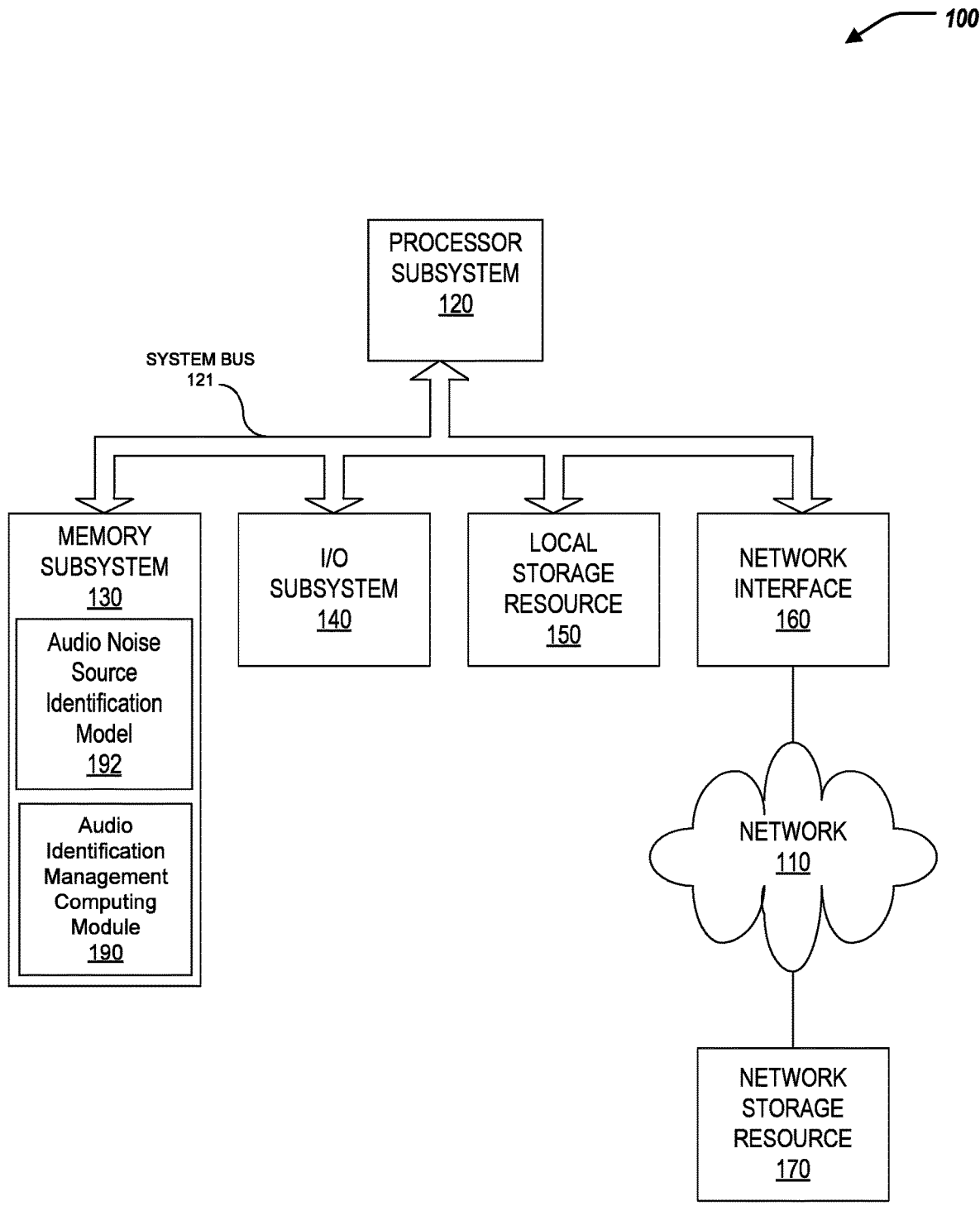
FIG. 1 is a block diagram of selected elements of an embodiment of an information handling system.

This disclosure discusses methods and systems for conducting an audio transparency mode in an information handling system. In short, a user can be physically located within an environment that includes the information handling system, and can interact with an audio application (e.g., a video conference application, or a media play application) of the information handling system that provides an audio stream that the user listens to. The user can receive the audio stream through headphones (or a headset).

In general, the when the user is engaged with a video teleconference or watching a movie on an information handling system while wearing headphones or a headset, the headphone or headset can isolate noise sources of the environment when the audio stream is provided to the user (e.g., noise isolating headphones). However, in some examples, a subset of the noise sources can be of interest to the user in that the user does not want to isolate the subset of noises. For example, the user can indicate that a noise source of a doorbell ring or a baby crying can be of interest to the user in that the user wishes to receive notification on such noise sources.

To that end, the subset of the noise sources that are of interest to the user can be identified, and when one of the noise sources of the subset marked as of interest is detected, the noise source can be provided through the audio output of the information handling system, a notification of the noise source can be provided to devices associated with the user, or both. For example, when a baby crying noise is detected, the audio stream provided to the user can be interrupted to include such noise, or a notification provided on a display of the information handling system indicating such detection of the noise.

Specifically, this disclosure discusses a system and a method or performing an audio transparency mode of an information handling system, including performing, at a first time, a calibration and configuration of an audio noise source identification model, including: identifying a plurality of noise sources associated with an environment of the information handling system; receiving user input from a user associated with the information handling system selecting a subset of the plurality of noise sources; training, based on the subset of the plurality of noise sources, the audio noise source identification model, including generating a configuration policy including configuration rules, the configuration rules for performing computer-implemented actions for providing a particular noise source of the subset of the plurality of noise sources through an audio output of the information handling system, providing a notification of the particular noise source to one or more devices associated with the user, or both; performing, at a second time, a steady-state monitoring of the information handling system, including: identifying a particular noise source of environment of the information handling system; and in response to identifying the particular noise source of the environment of the information handling system: i) accessing the audio noise source identification model including the configuration policy, ii) identifying one or more of the configuration rules of the audio noise source identification model based on the identified particular noise source, and iii) applying the one or more configuration rules to perform one or more of the computer-implemented actions to provide the particular noise source through the audio output of the information handling system, provide a notification of the particular noise source to the one or more devices associated with the user, or both.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
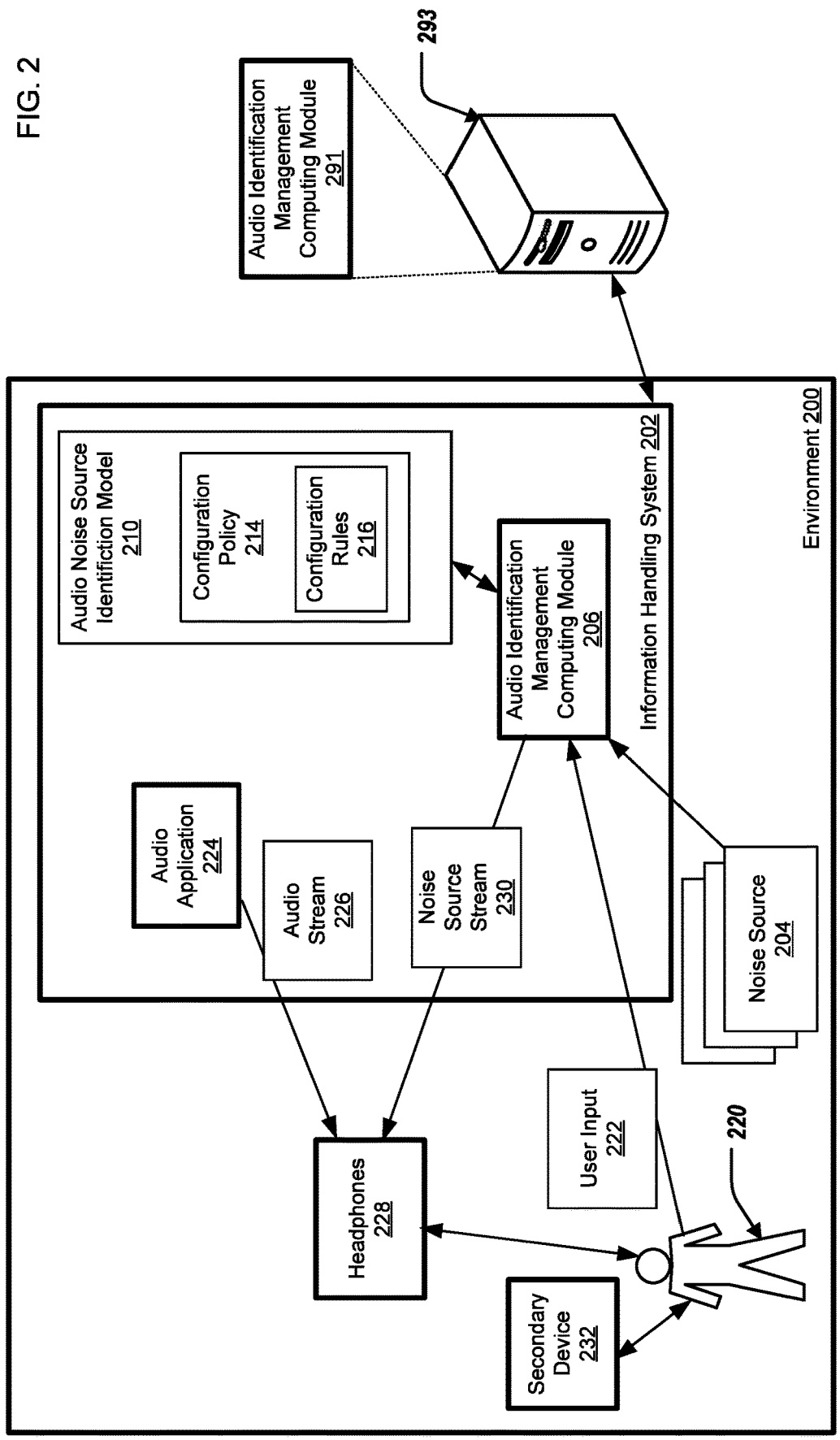
FIG. 2 illustrates a block diagram of an information handling system for conducting an audio transparency mode in the information handling system.
Figure 3:
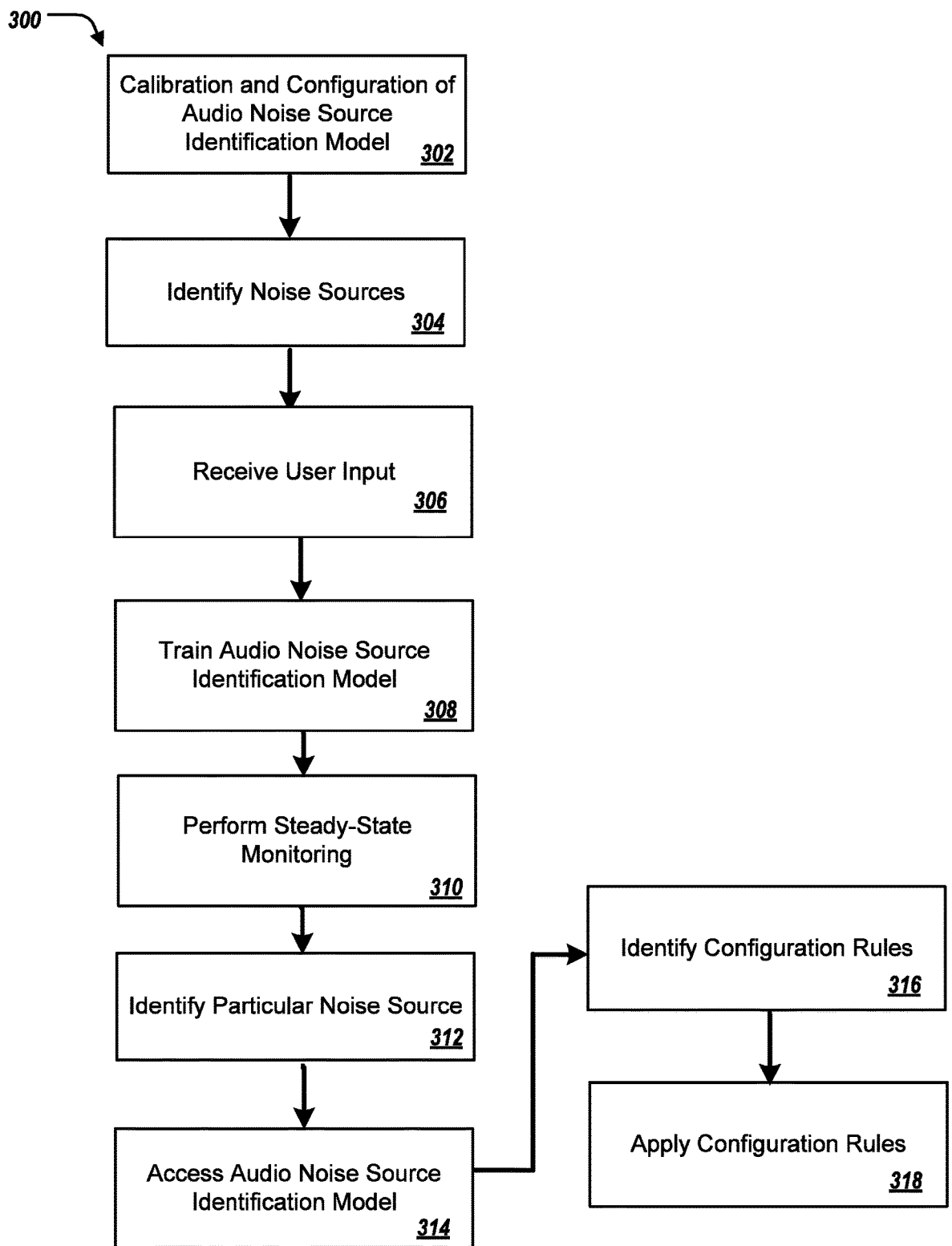
FIG. 3 illustrates a method for conducting an audio transparency mode in the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an audio identification management computing module 190. The audio identification management computing module 190 can be included by the memory subsystem 130. The audio identification management computing module 190 can include a computer-executable program (software). The information handling system 100 can also include an audio noise source identification model 192. The audio noise source identification model 192 can be included by the memory subsystem 130.

In short, when a user of the information handling system 100 is engaged with a video-teleconference application, noise isolation of non-stationary noises can be performed (e.g., by noise isolating headphones of the user). However, there may be a subset of the noise sources that the user of the information handling system 100 may wish to not be noise isolated—e.g., noises that are of importance to the user. For example, the sound of a doorbell may be of interest to a user of the information handling system 100, and wishes that such a sound is not isolated and/or provided a notification of such a sound. The audio identification management computing module 190 can identify such sounds that are of interest to the user, and access the audio noise source identification model 192 to provide rules that are performed when such sounds are identified, described further herein.

Turning to FIG. 2, FIG. 2 illustrates an environment 200 including an information handling system 202 and a cloud computing server 293. The information handling system 202 can include an audio identification management computing module 206. In some examples, the IHS 202 is similar to, or includes, the information handling system 100 of FIG. 1. In some examples, the audio identification management computing module 206 is the same, or substantially the same, as the audio identification management computing module 190 of FIG. 1.

In short, a user 220 can be physically located within the environment 200. The environment 200 can include (non-stationary) noise sources 204. In some cases, the environment 200 can be referred to as an audio environment 200. The user 220 can be interacting with an audio application 224 (e.g., a video conference application) that provides an audio stream 226 that the user 220 can interpret (e.g., the user is listening to the audio stream 226). The user 220 can receive the audio stream 226 from an audio output of the information handling system 202 that is provided to headphones 228 (or a headset 228) associated with the user 220. In other words, the headphones 228 are connected (coupled) to the information handling system 202, with the audio stream 226 provided as audio output of the information handling system 202 through the headphones 228. In some examples, the headphones 228 (or headset 228) can be noise-isolating headphones (or headset).

In general, the headphones 228 can provide noise isolation of one or more of the noise sources 204, e.g., when the audio stream 226 is provided to the audio output of the information handling system 202. However, in some examples, a subset of the noise sources 204 can be of interest to the user 220 in that the user 220 does not want to have noise isolation performed on the subset of noises 204. For example, the user 220 can indicate that a noise source 204 of a doorbell ring or a baby crying can be of interest to the user 220 in that the user 220 wishes to not have noise isolation performed on such noise sources 204.

To that end, the audio identification management computing module 206 can identify the subset of the noise sources 204 that are of interest to the user 220, generate an audio noise source identification model 210 to apply a configuration policy 214 based on the subset of the noise sources 204, described further herein. In some examples, the cloud computing server 293 can include a corresponding audio identification management computing module 291 that is in communication with the information handling system 202 (e.g., over one or more networks). The audio identification management computing module 291 can coordinate identifying the subset of the noise sources 204 that are of interest to the user 220, generating the audio noise source identification model 210 to apply the configuration policy 214 based on the subset of the noise sources 204 in coordination (or in lieu) of the audio identification computing module 206.

In some implementations, the audio identification management computing module 206 can perform, at a first time, a calibration and configuration of an audio noise source identification model 210. In some examples, the audio noise source identification model 210 is the same, or substantially the same, as the audio noise source identification model 192 of FIG. 1.

Specifically, performing the calibration and the configuration of the audio noise source identification model 210 can include identifying a plurality of noise sources 204 associated with the environment 200. Further, in response to identification of the noise sources 204 of the environment 200, the user 220 can provide user input 222 that is received by the audio identification management computing module 206. The user 220 can be associated with the information handling system 202, with the user input 222 indication a selection of a subset of the noise sources 204. The noise sources 204 can be non-stationary, and include such examples as a "doorbell" sound, a "baby crying" sound, and similar, for example.

In some examples, the audio identification management computing module 206 can receive a recorded version of the noise sources 204. For example, the user 220 can provide the recorded version of a subset of the audio noises 204 to the audio identification management computing module 206 that are of interest to the user 220. For example, the user 220 can provide the user input 222 to the audio identification management computing module 206 of recorded sounds that correspond to the noise sources 204 that are of interest to the user 220. The user 220 can provide the recorded sounds "live" in that the user 220 can provide the user input 222 to the audio identification management computing module 206 of the noise source 204 via a microphone coupled to the information handling system 202. For example, the user 220 can engage a doorbell to provide the "doorbell" noise, with a microphone of the information handling system 202 receiving such noise and providing a recording of the noise to the audio identification management computing module 206. The user 220 can provide the recorded sounds "pre-recorded" in that the user 220 can provide the user input 222 to the audio identification management computing module 206 of the noise source 204 via audio computer files. For example, the user can provide the user input 222 as an audio computer file of a "doorbell" noise that the audio identification management module 206 receives. For example, the user 220 can provide the user input 222 indicating an audio computer file stored by a third-party database (e.g., a public database that stores audio computer files) of a "doorbell" noise that the audio identification management module 206 receives.

In some examples, the audio identification management computing module 206 can identify the plurality of noise sources 204 through one or more of a central processing unit (CPU) such as the processor subsystem 120 of FIG. 1, and/or offload engines (e.g., provided at the cloud computing server 293) such as a graphics processing unit (GPU), a Gaussian Mixture Model and Neural Network Accelerator (GNA), a vison processing unit (VPU). The CPU, GPU, GNA, VPU can operate concurrently or serially.

In some examples, the audio identification management computing module 206 can detect the noise sources 204 over a period of time, and a provide a listing of the detected noise sources 204 to the user 220. For example, the audio identification management computing module 206 can receive and identify the noise sources 204 passively over a period of time (e.g., through a microphone of the information handling system 202). The audio identification management computing module 206 can receive and identify the noise sources 204 passively over a period of time in response to user input, or automatically. After the period of time, the identification management computing module 206 can provide a prompt to the user 220 indicating the noise sources 204—e.g., a listing of the noise sources 204. The user 220 can confirm which of the noise sources 204 that are of interest to the user 220. For example, the audio identification management computing module 206 can identify a "doorbell" noise, and provide a prompt to the user 220 (e.g., over a display of the information handling system 202) indicating the identification of the "doorbell" noise. The user 220 can provide the user input 222 indicating that the "doorbell" noise is of interest to the user 220.

In some implementations, the audio identification management computing module 206 can train, based on the selected subset of the noise sources 204, the audio noise source identification model 210. Specifically, the audio identification management computing module 206 can generate, based on the selected subset of noise sources 204, a configuration policy 214 that includes configuration rules 216. In some examples, the configuration rules 216 are rules for performing computer-implemented actions for providing the subset of the noise sources 204 through an audio output of the information handling system 202, providing a notification of the subset of the noise sources 204 to one or more devices associated with the user 220.

To that end, the audio identification management computing module 206 can train the audio noise source identification model 210 to establish connections between the selected subset of noise sources 204 and the configuration rules 216. Specifically, the audio noise source identification model 210 can identify one or more configurations rules 216 to be applied based on each noise source 204 of the selected subset of the noise sources 204. In some examples, a particular noise source 204 can be associated with two or more configuration rules 216. In some examples, the audio identification management computing module 206 can train the audio noise source identification model 210 using a machine learning process, and/or a neural network (e.g., a convolution neural network).

In some examples, the configuration rules 216 for providing a particular noise source 204 through the audio output of the information handling system 202 can include multiplexing the particular noise source 204 with the existing audio stream 226 of the audio output of the information handling system 202. For example, the configuration rules 216 can include combining (multiplexing) a noise source stream 230 that is generated based on the particular noise source 204 with the existing audio stream 226. In other words, the configuration rules 216 can include generating a multiplexed noise stream that includes the noise source stream 230 and the exiting audio stream 226. In some examples, the noise source stream 230 includes the particular noise source 204. That is, the information handling system 202 can generate the noise source stream 230 based on input of the particular noise source 204 (e.g., through a microphone of the information handling system 202) to include the particular noise source 204 (or a copy of the particular noise source 204).

In some examples, the configuration rules 216 for providing a particular noise source 204 through the audio output of the information handling system 202 can include muting the existing audio stream 226 of the audio output of the information handling system 202. For example, the configuration rules 216 can include muting the existing audio stream 226 and providing only the noise source stream 230 that is generated based on the particular noise source 204. That is, for the duration of the noise source stream 230, the existing audio stream 226 is muted.

In some examples, the configuration rules 216 for providing the notification of the subset of the noise sources 204 can include providing a notification on a display device of the information handling system 202. The notification can include a "pop-up" notification provided for display on the display device of the information handling system 202, and can indicate the particular noise source 204. For example, the notification can indicate "doorbell noise detected." In some examples, the notification can further indicate an action that the user 220 can take in response to the detection of the particular noise source 204. For example, the notification can include an user-selectable interface element of i) allowing the noise source stream 230 to be multiplexed with the existing audio stream 226 or ii) muting the existing audio stream 226 and providing only the noise source stream 230.

In some examples, the configuration rules 216 for providing the notification of the subset of the noise sources 204 can include providing a notification on a secondary computing device 232 associated with the user 220. For example, the secondary computing device 232 can include a smartphone or a tablet computing device associated with the user 220. The secondary computing device 232 can be in communication with the information handling system 202 to receive the notification. The notification can include a "pop-up" notification provided for display on a display of the secondary computing device 232, and can indicate the particular noise source 204. For example, the notification can indicate "doorbell noise detected." In some examples, the notification can further indicate an action that the user 220 can take in response to the detection of the particular noise source 204. For example, the notification can include an user-selectable interface element of i) allowing the noise source stream 230 to be multiplexed with the existing audio stream 226 or ii) muting the existing audio stream 226 and providing only the noise source stream 230.

In some implementations, the audio identification management computing module 206 can perform, at a second time after the first time, a steady-state monitoring of the information handling system 202. In other words, the audio identification management computing module 206 can monitor the information handling system 202 for computer-related events that could trigger activation of the configuration rules 216 by the audio identification management computing module 206.

Specifically, the audio identification management computing module 206 can identify a particular noise source 204 of the environment 200 of the information handling system 202, at the second time. For example, a microphone of the information handling system 202 can detect the particular noise source 204, and provide data indicating such detection to the audio identification management computing module 206. The audio identification management computing module 206 can access the audio noise source identification model 210 to identify the particular noise source 204.

In some examples, the audio identification management computing module 206 can identify the particular noise source 204 through one or more of a central processing unit (CPU) such as the processor subsystem 120 of FIG. 1, and/or offload engines (e.g., provided at the cloud computing server 293) such as a graphics processing unit (GPU), a Gaussian Mixture Model and Neural Network Accelerator (GNA), a vison processing unit (VPU). The CPU, GPU, GNA, VPU can operate concurrently or serially.

In some implementations, the audio identification management computing module 206 can, in response to identifying the particular noise source 204 of the environment 200 of the information handling system 202, access the audio noise source identification model 210 including the configuration policy 214. The audio identification management computing module 206 can further identify one or more of the configuration rules 216 of the audio noise source identification model 210 based on the identified particular noise source 204. Furthermore, the audio identification management computing module 206 can apply the configuration rules 216 to the information handling system 202. In other words, the audio identification management computing module 206 can apply appropriate configuration rules 216 based on the identified particular noise source 204 as provided by the audio noise source identification model 210.

In some examples, the audio identification management computing module 206 can apply the configuration rules 216 to automatically perform one or more computer-implemented actions to provide the particular noise source 204 through the audio output of the information handling system 202, provide a notification of the particular noise source 204 to the one or more devices associated with the user, or both. That is, audio identification management computing module 206 can apply the configuration rules 216 to provide the particular noise source 204 through the audio output of the information handling system 202, provide a notification of the particular noise source 204 to the one or more devices associated with the user, or both. For example, the audio identification management computing module 206 can identify the particular configuration rule 216 that corresponds to the particular noise source 204. The audio identification management computing module 206 can apply the configuration rules 216 to perform computer-implemented actions to provide the particular noise source 204 through the audio output of the information handling system 202, provide a notification of the particular noise source 204 to the one or more devices associated with the user, or both, based on the particular noise source 204.

For example, the audio identification management computing module 206 can identify a particular noise source 204 of a "doorbell." The audio identification management computing module 206, in response to the particular noise source 204 of a "doorbell," can access the audio noise source identification model 210, identify the configuration rules 216 that are applicable to the particular noise source 204 of the "doorbell," and apply such configuration rules 216. For example, the audio identification management computing module 206 can apply configuration rules 216 such as providing a notification to the display device of the information handling system 202 indicating the particular noise source 204 of the "doorbell" has been detected.

For example, the audio identification management computing module 206 can identify a particular noise source 204 of a "baby crying." The audio identification management computing module 206, in response to the particular noise source 204 of a "baby crying," can access the audio noise source identification model 210, identify the configuration rules 216 that are applicable to the particular noise source 204 of the "baby crying," and apply such configuration rules 216. For example, the audio identification management computing module 206 can apply configuration rules 216 such as providing a notification to the secondary computing device 232 indicating the particular noise source 204 of the "baby crying" has been detected.

For example, the audio identification management computing module 206 can identify a particular noise source 204 of a "baby crying." The audio identification management computing module 206, in response to the particular noise source 204 of a "baby crying," can access the audio noise source identification model 210, identify the configuration rules 216 that are applicable to the particular noise source 204 of the "baby crying," and apply such configuration rules 216. For example, the audio identification management computing module 206 can apply configuration rules 216 such as multiplexing the particular noise source 204 of the "baby crying" (as noise source stream 230) with the existing audio stream 226 of the audio output of the information handling system 202.

For example, the audio identification management computing module 206 can identify a particular noise source 204 of a "doorbell." The audio identification management computing module 206, in response to the particular noise source 204 of a "doorbell," can access the audio noise source identification model 210, identify the configuration rules 216 that are applicable to the particular noise source 204 of the "doorbell," and apply such configuration rules 216. For example, the audio identification management computing module 206 can apply configuration rules 216 such as muting the existing audio stream 226 of the audio output of the information handling system 202.

For example, the audio identification management computing module 206 can identify a particular noise source 204 of a "dog bark." The audio identification management computing module 206, in response to the particular noise source 204 of a "dog bark," can access the audio noise source identification model 210, and determine that the particular noise source 204 of the "dog bark" is not associated with any configuration rules 216, and take no further action.

FIG. 3 illustrates a flowchart depicting selected elements of an embodiment of a method 300 for conducting an audio transparency mode in the information handling system. The method 300 may be performed by the information handling system 100, the information handling system 202 and/or the audio identification management computing module 206, and with reference to FIGS. 1-2. It is noted that certain operations described in method 300 may be optional or may be rearranged in different embodiments.

The audio identification management computing module 206 performs, at a first time, a calibration and configuration of an audio noise source identification model 210 (302). The audio identification management computing module 206 identifies a plurality of noise sources 204 associated with an environment 200 of the information handling system 202 (304). The audio identification management computing module 206 receives the user input 222 from the user 220 (306). The audio identification management computing module 206 trains, based on the selected subset of noise sources 204, the audio noise source identification model 210 (308). Specifically, the audio identification management computing module 206 can generate, based on the selected subset of noise sources 204, a configuration policy 214 that includes configuration rules 216. In some examples, the configuration rules 216 are rules for performing computer-implemented actions for providing the subset of the noise sources 204 through an audio output of the information handling system 202, providing a notification of the subset of the noise sources 204 to one or more devices associated with the user 220. The audio identification management computing module 206 can perform, at a second time after the first time, a steady-state monitoring of the information handling system 202 (310). The audio identification management computing module 206 can identify a particular noise source 204 of the environment 200 of the information handling system 202 (312). The audio identification management computing module 206 can, in response to identifying the particular noise source 204 of the environment 200 of the information handling system 202, accesses the audio noise source identification model 210 including the configuration policy 214 (314). The audio identification management computing module 206 can further, in response to identifying the particular noise source 204 of the environment 200 of the information handling system 202, identify one or more of the configuration rules 216 of the audio noise source identification model 210 based on the identified particular noise source 204 (316). Furthermore, the audio identification management computing module 206 can, in response to identifying the particular noise source 204 of the environment 200 of the information handling system 202, apply the configuration rules 216 to the information handling system 202 (318). In some examples, the audio identification management computing module 206 can apply the configuration rules 216 to automatically perform one or more computer-implemented actions to provide the particular noise source 204 through the audio output of the information handling system 202, provide a notification of the particular noise source 204 to the one or more devices associated with the user, or both.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for performing an audio transparency mode of an information handling system, comprising:

performing, at a first time, a calibration and configuration of an audio noise source identification model, including:
identifying a plurality of noise sources associated with an environment of the information handling system;
receiving user input from a user associated with the information handling system selecting a subset of the plurality of noise sources;
training, based on the subset of the plurality of noise sources, the audio noise source identification model, including generating a configuration policy including configuration rules, the configuration rules for performing computer-implemented actions for providing a particular noise source of the subset of the plurality of noise sources through an audio output of the information handling system, providing a notification of the particular noise source to one or more devices associated with the user, or both;
performing, at a second time, a steady-state monitoring of the information handling system, including:
providing an audio stream as audio output to headphones coupled with the information handling system;
while providing the audio stream as audio output to headphones, identifying a particular noise source of the environment of the information handling system; and
in response to identifying the particular noise source of the environment of the information handling system:
i) accessing the audio noise source identification model including the configuration policy,
ii) identifying one or more of the configuration rules of the audio noise source identification model based on the identified particular noise source, and
iii) applying the one or more configuration rules to perform one or more of the computer-implemented actions to provide the particular noise source through the audio output of the information handling system including muting the audio stream and providing only a noise source stream to the headphones that is generated based on the particular noise source.

2. The computer-implemented method of claim 1, further comprising applying the one or more configuration rules to perform one or more of the computer-implemented actions to provide a notification of the particular noise source to the one or more devices associated with the user, wherein providing the notification to the one or more devices associated with the user includes providing the notification on a display device of the information handling system.

3. The computer-implemented method of claim 1, further comprising applying the one or more configuration rules to perform one or more of the computer-implemented actions to provide a notification of the particular noise source to the one or more devices associated with the user, wherein providing the notification to the one or more devices associated with the user includes providing the notification on a secondary computing device associated with the user.

4. The computer-implemented method of claim 3, wherein the secondary computing device is a smartphone, or tablet computing device.

5. The computer-implemented method of claim 1, wherein identifying the plurality of noise sources associated with the environment of the information handling system further comprises receiving a recorded version of each respective noise source of the plurality of noise sources.

6. The computer-implemented method of claim 1, wherein identifying the plurality of noise sources associated with the environment of the information handling system further comprises detecting the plurality of noise sources over a time period, and providing a listing of the plurality of noise sources to the user.

7. The computer-implemented method of claim 1, wherein the audio transparency mode is performed at the information handling system, a cloud computing server connected to the information handling system, or both.

8. An information handling system comprising a processor having access to memory media storing instructions executable by the processor to perform operations comprising, comprising:
 performing, at a first time, a calibration and configuration of an audio noise source identification model, including:
  identifying a plurality of noise sources associated with an environment of the information handling system;
  receiving user input from a user associated with the information handling system selecting a subset of the plurality of noise sources;
  training, based on the subset of the plurality of noise sources, the audio noise source identification model, including generating a configuration policy including configuration rules, the configuration rules for performing computer-implemented actions for providing a particular noise source of the subset of the plurality of noise sources through an audio output of the information handling system, providing a notification of the particular noise source to one or more devices associated with the user, or both;
 performing, at a second time, a steady-state monitoring of the information handling system, including:
  providing an audio stream as audio output to headphones coupled with the information handling system;
  while providing the audio stream as audio output to headphones, identifying a particular noise source of the environment of the information handling system; and
  in response to identifying the particular noise source of the environment of the information handling system:
   i) accessing the audio noise source identification model including the configuration policy,
   ii) identifying one or more of the configuration rules of the audio noise source identification model based on the identified particular noise source, and
   iii) applying the one or more configuration rules to perform one or more of the computer-implemented actions to provide the particular noise source through the audio output of the information handling system including muting the audio stream and providing only a noise source stream to the headphones that is generated based on the particular noise source.

9. The information handling system of claim 8, further comprising applying the one or more configuration rules to perform one or more of the computer-implemented actions to provide a notification of the particular noise source to the one or more devices associated with the user, wherein providing the notification to the one or more devices associated with the user includes providing the notification on a display device of the information handling system.

10. The information handling system of claim 8, further comprising applying the one or more configuration rules to perform one or more of the computer-implemented actions to provide a notification of the particular noise source to the one or more devices associated with the user, wherein providing the notification to the one or more devices associated with the user includes providing the notification on a secondary computing device associated with the user.

11. The information handling system of claim 10, wherein the secondary computing device is a smartphone, or tablet computing device.

12. The information handling system of claim 8, wherein identifying the plurality of noise sources associated with the environment of the information handling system further comprises receiving a recorded version of each respective noise source of the plurality of noise sources.

13. The information handling system of claim 8, wherein identifying the plurality of noise sources associated with the environment of the information handling system further comprises detecting the plurality of noise sources over a time period, and providing a listing of the plurality of noise sources to the user.

14. The information handling system of claim 8, wherein the plurality of noise sources associated with the environment of the information handling system are identified using one or more of a central processing unit (CPU), a graphics processing unit GPU), a Gaussian Mixture Model and Neural Network Accelerator (GNA), and a vison processing unit (VPU).

15. A non-transitory computer-readable medium storing software comprising instructions executable by one or more computers which, upon such execution, cause the one or more computers to perform operations comprising:
 performing, at a first time, a calibration and configuration of an audio noise source identification model, including:
  identifying a plurality of noise sources associated with an environment of the information handling system;
  receiving user input from a user associated with an information handling system selecting a subset of the plurality of noise sources;
  training, based on the subset of the plurality of noise sources, the audio noise source identification model, including generating a configuration policy including configuration rules, the configuration rules for performing computer-implemented actions for providing a particular noise source of the subset of the plurality of noise sources through an audio output of the information handling system, providing a notification of the particular noise source to one or more devices associated with the user, or both;
 performing, at a second time, a steady-state monitoring of the information handling system, including:
  providing an audio stream as audio output to headphones coupled with the information handling system;
  while providing the audio stream as audio output to headphones, identifying a particular noise source of the environment of the information handling system; and
  in response to identifying the particular noise source of the environment of the information handling system:
   i) accessing the audio noise source identification model including the configuration policy,
   ii) identifying one or more of the configuration rules of the audio noise source identification model based on the identified particular noise source, and
   iii) applying the one or more configuration rules to perform one or more of the computer-implemented actions to provide the particular noise source through the audio output of the information handling system, including muting the audio stream and providing only a noise source stream to the headphones that is generated based on the particular noise source.

* * * * *